Dec. 15, 1964   L. PERAS   3,161,426
LATCH FOR VEHICLE CLOSURE MEMBER
Filed June 7, 1961   3 Sheets-Sheet 1
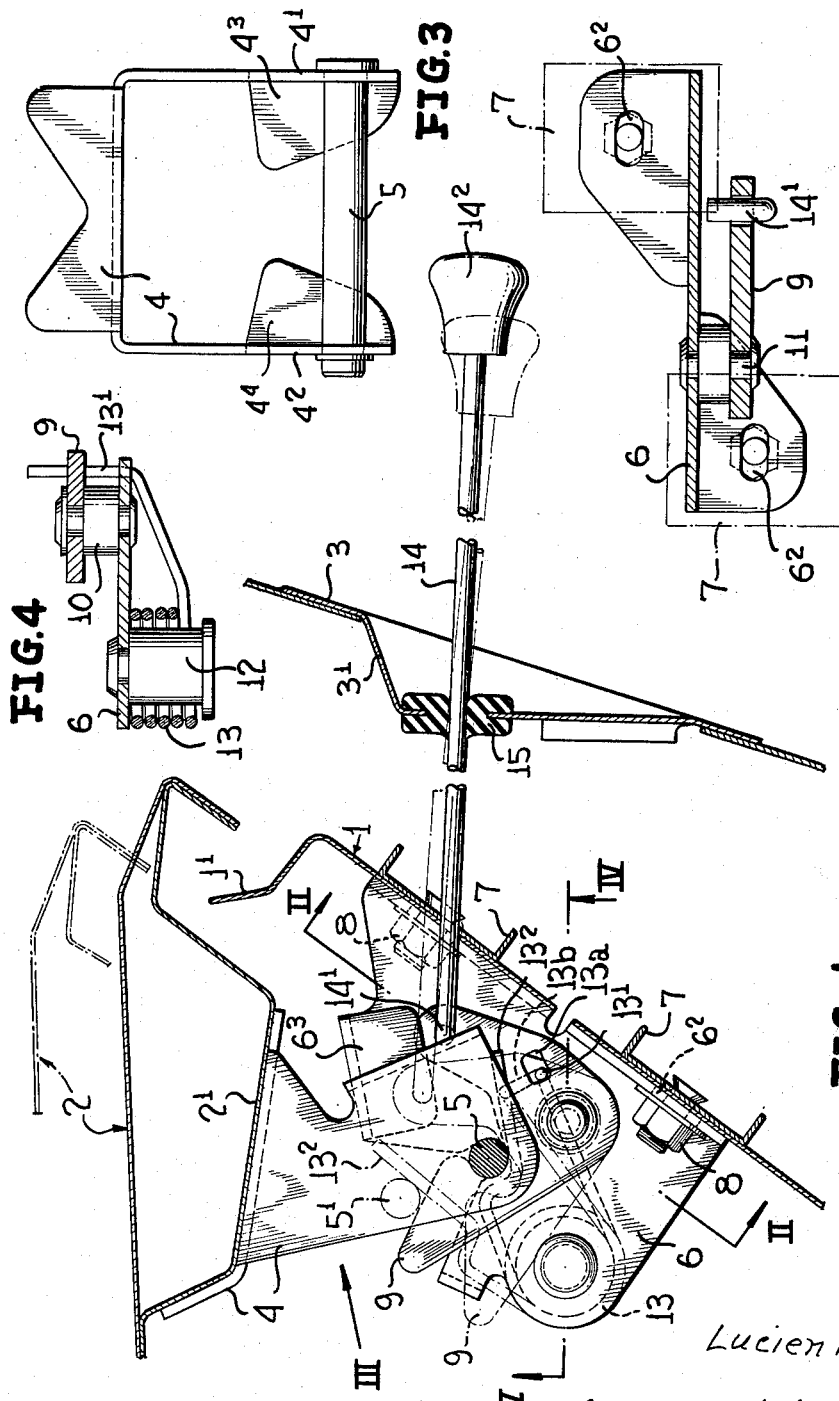
INVENTOR
Lucien Peras
BY Stevens Davis Miller & Mosher
ATTORNEYS

United States Patent Office 3,161,426
Patented Dec. 15, 1964

3,161,426
LATCH FOR VEHICLE CLOSURE MEMBER
Lucien Péras, Billancourt, France, assignor to Regie Nationale des Usines Renault, Billancourt, France
Filed June 7, 1961, Ser. No. 115,558
Claims priority, application France, June 10, 1960, 829,656, Patent 1,273,892; Nov. 24, 1960, 844,917
5 Claims. (Cl. 292—99)

The invention relates to a fastening device for a closure member which is more particularly applicable to vehicles in which the front closure member has its pivotal hinges located in front of the vehicle; the main advantages of this device are is simplicity and its reliability in operation.

Various forms of embodiment will be described below as applicable to the rear extremity of the closure member and being supported by the dashboard which separates the front luggage compartment from the interior of the body.

The invention is illustrated in the accompanying drawings, in which:

FIG. 1 is a cross-section view in elevation of the device;

FIG. 2 is a plan view of the fastening support in cross-section along the line II—II of FIG. 1;

FIG. 3 is a view in profile of the bolt support looking in the direction of the arrow III of FIG. 1.

FIG. 4 is a view in partial cross-section of the fastening support and of the pivoted catch, taken along the line IV—IV of FIG. 1;

Figure 5:
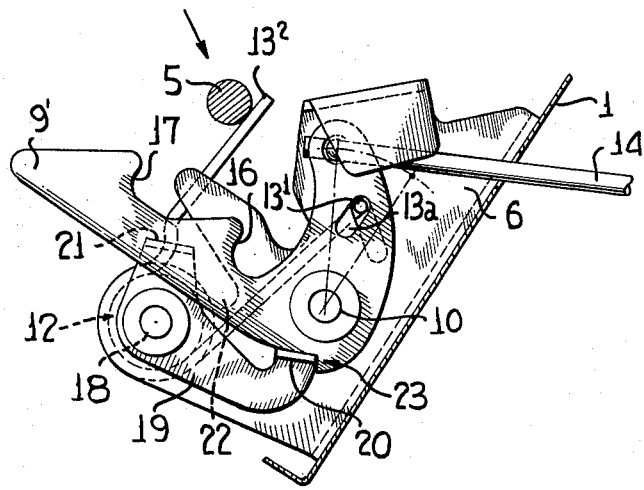
FIG. 5 is a view in elevation of an alternative form of the device in the open position of the closure member.

It can be seen from FIG. 1 that the bolt support 4 is fixed by welding and riveting on a cross-member $2^1$ of the front closure member 2 which is shown in full lines in the closed position and in chain-dotted lines in the released position.

On the steel sheet of the dashboard 1 is provided a gutter $1^1$, in order to make the front luggage compartment water-tight.

In addition, the device is operated from the interior of the vehicle through the scuttle sheet 3 which is provided with a recessed portion $3^1$ for that purpose.

The catch support 6 is fixed on the dashboard by bolts 8, the heads of which are applied against reinforced portions 7. Elongated holes $6^2$ provided in the catch support permit the adjustment of the device.

On the support 6 is fixed a shaft 10 provided with a shoulder 11 on which the moving catch 9 is engaged and pivoted. This moving catch has a special recessed portion in which the bolt 5 is engaged in the closed position, the bolt being constituted by a cylindrical shaft with a collar passing simply through the two folded-back edges $4^1$ and $4^2$ (see FIG. 3), which form the two side-plates of the bolt support; a spring 13 which has a double function, which will be explained later, is mounted on the shaft 12 riveted on the catch support 6.

This support thus receives two riveted shafts 10 and 12.

One extremity $13^1$ of the spring 13 engages with a hook in an elongated slot $13a$ of the moving catch 9, and also in an elongated slot $13b$ of the support 6 which is directed upwards so as to thereby to limit the movement of the moving catch and the displacement of this portion of the spring and the other extremity $13^2$ of the spring is applied on the bolt 5 (this extremity is not shown in the section of FIG. 4).

It will be observed that the catch support comprises a portion $6^3$ folded to the shape of a V. This V-shaped portion serves as a guide for the moving portion (bolt support) at the moment when the closure member is allowed to fall into the released position.

In fact, the member 4 carries two wings $4^3$ and $4^4$ folded back perpendicularly to the closure member and centered on the folded-back portion $6^3$.

Finally, an operating rod 14, fitted with a knob $14^2$ passes through a rubber plug 15 which is inserted in the steel sheet 3.

This rod is provided at its extremity with a hook $14^1$ which engages in a corresponding hole in the moving catch.

The operation of the system is as follows:

The closure member in the closed position, the moving catch occupies the position shown in full lines. At that moment, the bolt 5 is engaged in the notch specially formed in the catch 9 and cannot disengage.

The spring 13 applies a force on the catch by its extremity $13^1$, and on the bolt by its other extremity $13^2$; it is in the tensioned condition, ready to open by pushing the bolt 5.

When the rod 14 is pushed by the knob $14^2$, the latter being held centered by the plug 15 in which it slides with easy friction, pushes the moving catch towards the front by about 20 to 25°, the catch then occupying the position shown in chain-dotted lines in FIG. 1.

At the end of the travel of the knob $14^2$, as soon as the catch has exceeded a certain angle of rotation, the bolt 5 escapes from the hook of the catch 9, and under the force of the extremity $13^2$ of the spring 13, the bolt is pushed back upwards until it comes into the position $5^1$, thus raising the closure member.

At the moment, it is disengaged and in the position of rest after the ejection of the closure member, and it is then possible to open the closure member fully by lifting the edge of this latter.

In the opposite direction, the falling back of the closure member results in automatic closure, the wings $4^4$ and $4^3$ of the bolt support 5 centering the closure member by embracing the folded-back portion $6^3$ of the catch support.

The bolt 5 then pushes back the extremity $13^2$ of the spring 13, and then becomes engaged in the slot of the catch 9; the tension given to the spring 13 tends to bring back the catch into its initial position, which completely hooks the bolt 5, while the control-rod 14 is moved back toward the rear, the closure member and its control being then in the closed position.

Figure 6:
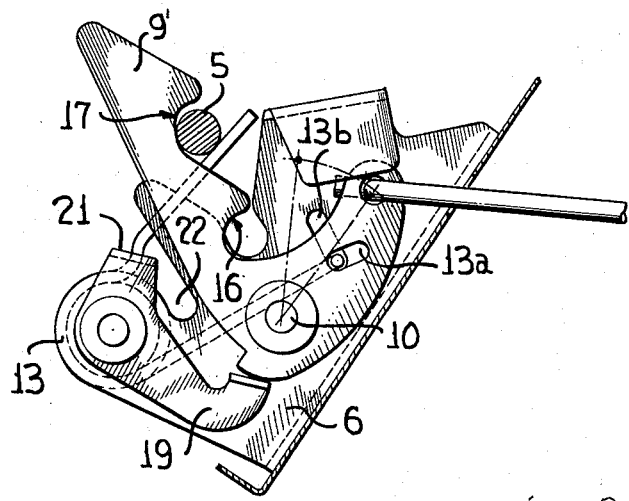
FIG. 6 is a view in elevation of the same alternative form as in FIG. 5, in the incomplete position of closure of the closure member, the bolt being engaged in the safety notch.
Figure 7:
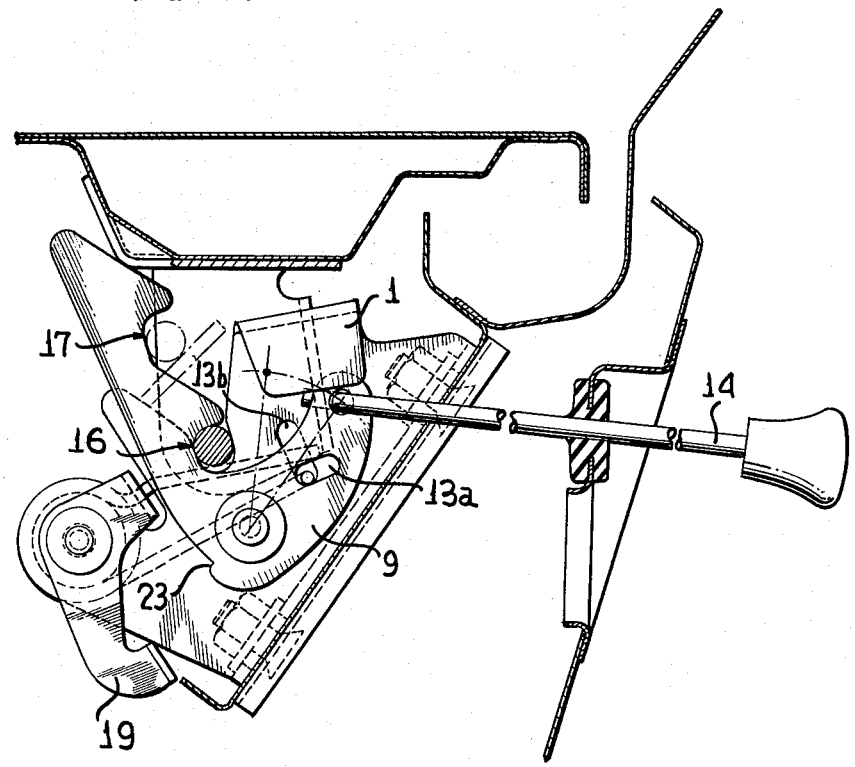
FIG. 7 is a view of the same device in the position of complete closure of the closure member.

A further alternative form, in which the catch is provided with a safety notch to prevent accidental opening of the closure member in the case where the bolt is badly engaged in the main notch, will now be described with reference to FIGS. 5 to 7, in which the same parts have been given the same reference numbers as before.

The fastening again comprises the two parts, the catch $9^1$ and the bolt 5; the catch is mounted on the catch support 6 fixed on the outer face of the dashboard 1. The catch $9^1$ is pivoted at 10 and has two latching notches 16 and 17 to receive the bolt 5. The notch 16 corresponds to the complete closure of the closure member, while the notch 17 is the safety notch corresponding to incomplete closure.

The spring 13 is again carried by the catch support 6 and is wound on the tubular shaft 12, the bottom of which is riveted on the plate 6 by a riveted shaft 18, on which is pivoted a lever 19 with two arms, one of which carries a stop 20, the function of which will be explained below.

One of the arms $13^2$ of the spring 13 is intended to be supported against the bolt 5, while the arm $13^1$ is bent back at its free extremity in the form of a hook which comes into engagement with the slots $13a$ of the moving catch and $13b$ of the support 6. The spring 13 applies a force on the catch by its extremity 13¹, and on the bolt by its other extremity 13². It should be noted that in the form of construction of this alternative, the arm 13² of the spring 13 passes into an orifice of a lug 21, formed by bending back the extremity of the second arm of the lever 19. During its movement, this lever 19 engages the lug 21 in a slot 22 formed in the plate 6.

It will finally be observed that in the position of opening of the closure member (FIG. 5), the stop 20 of the lever 19 engages the shoulder or notch 23 of the catch 9¹ under the action of the spring 13, the arm 13² of which drives the lever 19.

The spring 13 has a six-fold effect instead of four-fold as in the previous form of embodiment:

(1) Damping the movement of the closure member when the latter is dropped to close it.
(2) Disengagement of the opening stop 20.
(3) Return of the catch 9¹ against the bolt 5.
(4) Stopping the catch 9¹ in the closed position in the case where the bolt 5 is not engaged.
(5) Ejection of the closure member.
(6) Returning the opening stop 20 into the shouldered portion 23 of the catch 9¹.

The operation of the device for closing the closure member is as follows:

When the closure member is allowed to fall normally by its own inertia, it passes the safety notch 17 and is automatically engaged in the closed position in the notch 16. This movement is effected in the following manner: during its trajectory, the bolt 5 comes into contact with the arm 13² of the spring 13. The latter then drives the lever 19 which disengages from the shoulder 23, thus freeing the moving catch 9¹ which moves back on the bolt 5. The latter is then located in its safety position. It continues its trajectory by acting on the slope of the catch 9¹ which opens out and then closes to engage the bolt in the notch 16 for the position of complete closure.

On the other hand, if the fall of the closure member is too feeble, the bolt 5 does not advance as far as the closure notch 16; it passes only as far as the safety notch 17 and is thus held in this position.

In this case, the complete closure is obtained by giving an additional downward push on the closure member.

The opening is effected by acting fully on the operating rod 14, the catch 9¹ being then maintained open by the shoulder 23 which comes into engagement with the stop 20 in such manner as to remove the notches 16 and 17 from the trajectory of the bolt 5, thus permitting the bolt to be disengaged.

If an incomplete action is applied on the opening control rod, the bolt is disengaged from the closure notch 16, but remains held in the safety notch 17.

The adoption of a safety notch on the moving catch permits the vehicle to travel in complete safety without fear of accident, when the closure member is not completely closed and pushed down to engage the main closure notch.

I claim:
1. A fastening device for a closure member comprising a bolt element disposed on the inner surface of said closure member, a stationary support adjacent said closure member, two shaft stubs on said stationary support, a catch element pivoting about the first of said shaft stubs and having a notch which engages said bolt element when said closure member is in the closed position, a spring freely pivoting about the second of said shaft stubs and adjacent to said catch element, said spring having a first extension engaging said bolt element when the latter is engaged in said notch and a second extension operatively engaging said catch element, said stationary support being provided with limiting means which define limited pivoting of both said second extension and said catch about their respective shaft stubs between a first position, wherein said bolt element is locked in said notch, and a second position wherein said bolt element is ejected from said notch by the action of the first extension of said spring thereby causing the release of said closure member, and a control lever coupled to said catch element to actuate the latter.

2. A fastening device according to claim 1 wherein said spring is a helicoidal spring coiled on said second of the shaft stubs.

3. A fastening device according to claim 1 wherein said limiting means provided on said stationary support are constituted by an elongated slot and said catch element is provided with a further slot, the second extension of said spring passing through both said slots and being movable within said elongated slot.

4. A fastening device for a closure member according to claim 1 wherein said catch element is provided with a shoulder and wherein a lever is pivoted about the second of said shaft stubs, said lever having a first arm carrying a stop which engages said shoulder when said catch element is in said second position (release of the closure member) and a second arm driven by the first extension of said spring, said first extension causing the disengaging of said first arm from said shoulder when said closure member is closed.

5. A fastening device according to claim 1, wherein said catch member has a safety notch disposed therein to be engaged by said bolt element when said closure member is not completely fastened.

References Cited by the Examiner
UNITED STATES PATENTS

| | | | |
|---|---|---|---|
| 2,693,381 | 11/54 | Butler | 292—117 |
| 2,877,038 | 3/59 | Kramer | 292—216 |
| 3,010,749 | 11/61 | Brissette et al. | 292—27 |

ALBERT H. KAMPE, *Primary Examiner.*

M. HENSON WOOD, JR., *Examiner.*